UNITED STATES PATENT OFFICE.

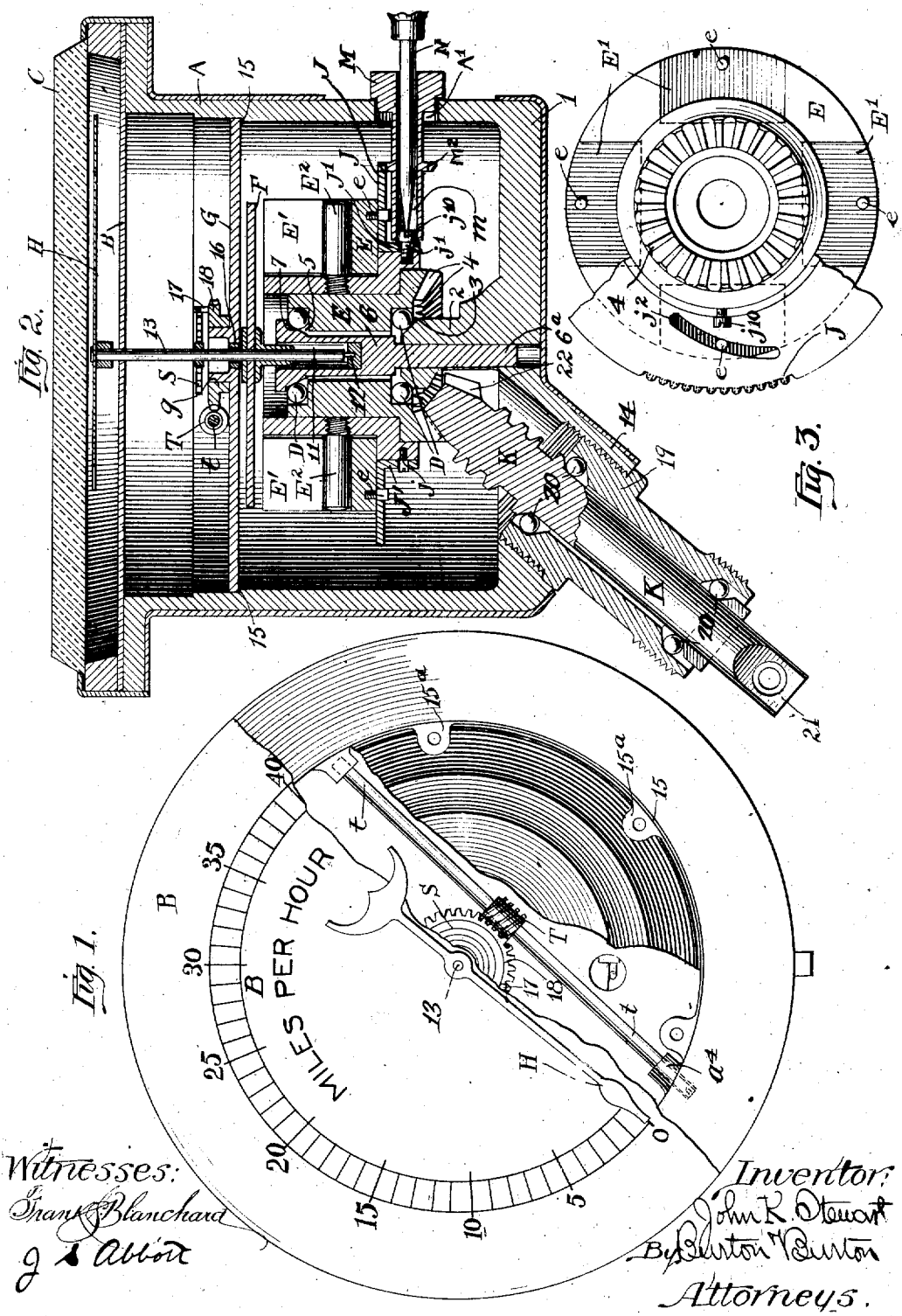

JOHN K. STEWART, OF CHICAGO, ILLINOIS.

MAGNETIC TACHOMETER.

989,650.

Specification of Letters Patent.

Patented Apr. 18, 1911.

Application filed March 29, 1909. Serial No. 486,362.

*To all whom it may concern:*

Be it known that I, JOHN K. STEWART, a citizen of the United States, residing at Chicago, in the county of Cook and State of Illinois, have invented new and useful Improvements in Magnetic Tachometers, of which the following is a specification, reference being had to the accompanying drawings, forming a part thereof.

The purpose of this invention is to provide an improved speed measuring device of the class in which there are associated three elements,—a magnet, its armature and a third element of low magnetic resistance interposed in the magnetic field,—one of the three elements being rotated and the second having an indicating device, as an index finger, and being mounted for oscillation against a yielding resistance or biasing means, the deflection of the index finger being caused by the magnetic drag of the rotating element upon the oscillating element.

It consists of the features of construction and their combinations shown and described as set forth in the claims.

In the drawings:—Figure 1 is a face view of a tachometer embodying this invention, a portion of the dial plate and armature disk being broken away to disclose the interior elements. Fig. 2 is an axial section of the same. Fig. 3 is an inverted plan view of the magnets and carrier and adjusting device, the latter being partly broken away.

In the structure shown embodying this invention, there is employed an inclosing case, A, substantially cylindrical in form, open at one end, at which there is mounted a dial plate, B, protected by a glass, C. At the center of the case, rigid with the back or bottom disk or web, 1, thereof, there is erected and preferably formed integrally with said web a post, 2, upon which the magnet hereinafter described is mounted for rotation. Preferably, the post is constructed to provide ball bearings for the magnet, and for that purpose is reduced in diameter at its upper part, reduction commencing with an inclined shoulder, 3, which constitutes the lower ball seat of the ball bearing indicated by the balls, D, and the post may be divided transversely above this ball seat, the upper member, 6, being made with a long tenon or spindle, 6ª, for connecting it with the lower member of the post, the latter being axially apertured to receive said tenon or spindle, and said upper member being at its upper end expanded to form a cone, 7, corresponding to the sloping shoulder, 3, for the upper ball bearing.

Suitable ball recesses are formed by annular rabbets, 5, in the magnet element. The magnet element comprises the body or magnet carrier, E, which terminates at the lower end in an interior beveled gear rim, 4, and is axially apertured for passing on to the reduced upper portion or upper member, 6, of the post, 2, and provided with annular rabbets, 5, to form the ball recesses above mentioned. The spindle, 6ª, of said upper member, 6, is designed to fit snugly in the axial aperture of the lower member, 2 of the post, so as to preserve the upper member in perfect axial alinement with the lower bearing of the magnet element. In the magnet body or carrier, E, there are mounted a plurality,—as illustrated, four,—of horse-shoe magnets, $E^1$, said body being recessed to receive these magnets which fit snugly in their respective recesses which they enter radially and in which they are further positioned longitudinally with respect to the magnet body by radial guide studs, $E^2$, which are rigid with said body or carrier and on to which the magnets pass in entering the radial recesses provided for them in the carrier.

Below the magnet seats or recesses the carrier, E, is reduced in diameter to form a cylindrical hub upon which there is mounted a sleeved gear, J, whose sleeve portion, $J^1$, fits upon said reduced cylindrical hub of the carrier and is stopped longitudinally thereon by studs, $j$, $j^1$, projecting from the hub and taking into circumferentially extending slots, in the sleeve, one of said studs, $j^1$, being a screw having a slotted head, $j^{10}$, for binding on the sleeve to secure the device in adjustment. In the gear itself,—that is, the portion which constitutes the annular flange about the sleeve,—there are formed four slots, $j^2$, of which one is shown in Fig. 3 slightly and similarly eccentric with respect to the sleeve, and each of the magnets is provided with a downwardly projecting stud, $e$, taking into the corresponding slot, $j^2$, so that the rotation of the gear causes the magnets to be moved slightly radially with respect to the carrier. This adjustment is provided for the purpose of calibration to vary the leverage by which the magnetic drag operates upon the oscillating disk for actuating the index finger hereinafter described.

For effecting the adjustment in the original assembling and calibration of the instrument, the case, A, has a lateral aperture, A¹, whose margin affords a bearing for a key, M, which is adapted to be inserted therethrough, said key having a tubular stem whose cavity, $m$, fits the head of the screw, $j^1$, said head thereby becoming a second bearing for the key. At suitable position in its length for meshing with the gear flange, J, when the key is centered on the screw, $j^1$, there is formed on the key a pinion, M², by which the gear may be rotated by rotating the key. The axial aperture of the key admits a small screw driver, N, which may be inserted therethrough for engaging the head of the screw, $j^1$, to loosen the screw before rotating the key and for tightening it after the adjustment is effected. It will be understood that the key and screw driver are not permanently associated with the case, but are introduced thereinto only for the purpose of adjustment described. It will be understood that the gear flange, J, need not be toothed except for a segment corresponding to the range of one of the cam slots, and it is so illustrated.

The upper member, 6, of the post, 2, is axially bored at 11, from its upper end, and receives at the bottom of said bore a step bearing, 12, for the spindle, 13, of a disk, F, made of material having low magnetic resistance, such as aluminum. This disk is positioned so as to be spaced a very short distance from the upper poles of the magnet. The case, A, is interiorly rabbeted to form a shoulder, 15, and is also provided with posts 15ᵃ, positioning and supporting an armature disk, G, which also serves to complete the inclosure of the chamber in which the magnet and the disk, F, are located. The spindle, 13, of the disk, beside its step bearing at 12, may be provided with a second steadying bearing, 16, at the center of the disk, G, which is penetrated by the spindle and carries at its upper end an index finger, H. Above the armature disk, G, there is located a helical spring, S, connected at its inner end with the spindle and at its outer end with a stud, 17, projecting laterally from a worm gear, 18, mounted upon the hub, $g$, of the disk, G, for rotation thereon, and meshing with a worm, T, on a horizontal shaft, $t$, which is journaled in the case and accessible through an aperture, $a^4$, therein for rotating the worm to thereby rotate the worm gear to adjust the position of the outer end of the helical spring to vary its tension and the yielding resistance which it opposes to the drag of the magnet upon the disk, F.

The two means shown for modifying the action of the magnet on the disk, F, are each desirable, the adjustment of the magnets radially in the carrier being designed to be resorted to in the construction of the instrument for calibrating, and the adjustment of the tension of the spring being resorted to whenever necessary to compensate for changes of tension which may be due to temper or other causes operating upon the spring. However, either expedient may be taken advantage of for calibrating.

The bottom web, 1, of the case has an obliquely projecting hollow boss, 14, into which is screwed the journal bearing, 19, of the shaft, K, having ball bearings at 20, 20, in said journal bearing element. This shaft, K, at its inner end within the case terminates in a beveled pinion, 22, which meshes with the internal beveled gear, 4, formed at the lower end of the magnet carrier, as described for communicating rotary motion to said carrier. The shaft, K, is designed to be connected in any convenient manner with the shaft whose rotary speed is to be indicated by the instrument, and it is shown flattened and apertured at its end, 21, to indicate the intention and adaptation for such connection.

I claim :—

1. In a magnetic tachometer, in combination with a case, a post within the case; a permanent magnet element and an armature, one mounted for rotation on the post and the other supported fixedly on the case, the magnet element comprising a carrier and a magnet movable radially on the carrier; a low resistance disk positioned between the magnet element and the armature, having a spindle provided with a step bearing within the post and extending through the fixed element; a spring which operates to hold the disk yieldingly against rotation away from a predetermined position; an indicator carried by the spindle, and means for adjusting the magnet radially on the carrier.

2. In a magnetic tachometer, in combination with a case, a post within the case; a permanent magnet element and an armature, one mounted for rotation on the post and the other supported fixedly on the case, the magnet element comprising a carrier, and a plurality of horse-shoe magnets mounted for movement radially on the carrier; a low resistance disk positioned between the magnet element and the armature, having a spindle provided with a step bearing within the post and extending through the fixed element; a spring which operates to hold the disk yieldingly against rotation away from a predetermined position; an indicator carried by the spindle, and means for adjusting the horse-shoe magnets radially on the carrier.

3. In a magnetic tachometer, in combination with a permanent magnet element and an armature mounted for relative rotation, a low resistance disk positioned between the magnet and the armature, mounted for oscillation about the axis of rotation of the rotating element; means for yieldingly resisting such oscillation, the magnet being mounted for movement radially with respect to the axis of rotation, and means for adjusting it radially.

4. In a magnetic tachometer, in combination with a permanent magnet element, one mounted for rotation and the other fixedly supported; a low resistance disk positioned between the magnet and the armature, mounted for oscillation about the axis of rotation of the rotating element; means which yieldingly resists its movement away from a pre-determined position, the rotating element comprising parts which are adjustable radially with respect to the axis of rotation, and means for so adjusting such parts.

5. In a magnetic tachometer, in combination with a permanent magnet element and an armature, a support for both said elements with respect to which one is mounted for rotation and the other is supported fixedly; a low resistance disk positioned between the magnet and the armature, mounted for oscillation about the axis of rotation; means which yieldingly resists its movement away from a pre-determined position, the magnet element comprising a carrier and a magnet mounted for radial movement thereon, and means for adjusting the magnet radially on the carrier.

6. In a magnetic tachometer, in combination with a permanent magnet element and an armature, a support for both said elements with respect to which one is mounted for rotation about an axis and the other is supported fixedly; a low resistance disk positioned between the magnet and the armature, mounted for oscillation about the axis of rotation of the rotating element; means for yieldingly resisting the movement of said oscillating element away from a pre-determined position, the magnet element comprising a carrier and a plurality of magnets disposed about the axis of rotation, movable on the carrier radially with respect to said axis, and means for adjusting the magnets with respect to said axis.

7. In a magnetic tachometer, in combination with a case, a permanent magnet element mounted in the case for rotation; an armature supported fixedly on the case; a low resistance disk positioned between the magnet and the armature, mounted for oscillation about the axis of rotation of the magnet; means operating to hold the disk yieldingly against movement in the plane of oscillation away from a pre-determined position, the magnet element comprising a carrier, and a plurality of magnets disposed thereon about the axis of rotation, mounted for adjustment toward and from the axis; a cam plate mounted on the carrier for movement relatively thereto about the axis and means by which it engages the magnets for moving them on the carrier by rotation of the plate, and means for rotating the plate.

8. In a magnetic tachometer, in combination with a case, a permanent magnet element mounted in the case for rotation; an armature supported fixedly on the case; a low resistance disk positioned between the magnet and the armature mounted for oscillation about the axis of rotation of the magnet; means operating to hold the disk yieldingly against movement in the plane of oscillation away from a pre-determined position, the magnet element comprising a carrier and magnets disposed thereon about the axis of rotation mounted for adjustment toward and from the axis; a cam plate mounted on the carrier for rotation relatively thereto and means by which it engages the magnets for moving them toward and from the axis by rotation of the cam plate, said cam plate being provided with means for engagement at its periphery to adjust it about said axis, the case having an aperture through which access may be obtained to said periphery for adjusting the cam plate.

9. In a magnetic tachometer, in combination with a case, a permanent magnet element mounted in the case for rotation; an armature supported fixedly on the case; a low resistance disk positioned between the magnet and the armature mounted for oscillation about the axis of rotation of the magnet; means operating to hold the disk yieldingly against movement in the plane of oscillation away from a pre-determined position, the magnet element comprising a carrier and magnets disposed thereon about the axis of rotation mounted for adjustment toward and from the axis; a cam device mounted on the carrier for rotation relatively thereto and means by which it engages the magnets for moving them toward and from the axis of rotation of the cam device; a binding screw for securing the cam device in adjusted position about said axis, the cam device having a gear segment; the case having an aperture which affords bearing for a key to be inserted therethrough for engagement with the clamping screw, and means to engage the gear segment to rotate the cam device.

10. In a magnetic tachometer, in combination with a case, an interior post; a permanent magnet element and an armature, one mounted for rotation on the post and the other supported fixedly on the case; a low resistance disk positioned between the magnet element and the armature, having a spindle stepped in the post and extending through the fixed element; a worm gear mounted for rotation on the armature about the axis of the spindle; a spring connected at one end to said worm gear and at the other end to the spindle for holding the disk yieldingly against rotation from pre-determined position; a worm engaging said worm gear, and means for rotating the worm.

11. In combination with a permanent magnet element and an armature element mounted for relative rotation, one of said elements having peripheral portions movable with respect to the remainder of said element toward and from the axis of rotation; means for so moving the same; a low-resistance disk positioned between the magnet and the armature mounted for rotation about the axis of the rotating element, and a spring for yieldingly resisting such rotation.

In testimony whereof, I have hereunto set my hand, in the presence of two witnesses, at Chicago, Illinois, this 25th day of March, A. D. 1909.

JOHN K. STEWART.

In the presence of—
M. GERTRUDE ADY,
JULIA S. ABBOTT.